(12) United States Patent
Hamada et al.

(10) Patent No.: US 11,181,285 B2
(45) Date of Patent: Nov. 23, 2021

(54) AIR CONDITIONING VENTILATION DEVICE, AIR CONDITIONING SYSTEM, AND CONTROL METHOD

(71) Applicant: Mitsubishi Electric Corporation, Tokyo (JP)

(72) Inventors: Mamoru Hamada, Tokyo (JP); Hayato Horie, Tokyo (JP); Masami Yasuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 153 days.

(21) Appl. No.: 16/484,174

(22) PCT Filed: Apr. 10, 2017

(86) PCT No.: PCT/JP2017/014708
§ 371 (c)(1),
(2) Date: Aug. 7, 2019

(87) PCT Pub. No.: WO2018/189790
PCT Pub. Date: Oct. 18, 2018

(65) Prior Publication Data
US 2020/0326086 A1 Oct. 15, 2020

(51) Int. Cl.
*F24F 11/00* (2018.01)
*F24F 7/08* (2006.01)
*F24F 7/10* (2006.01)

(52) U.S. Cl.
CPC ............ *F24F 11/0001* (2013.01); *F24F 7/10* (2013.01)

(58) Field of Classification Search
CPC ...... F24F 2012/007; F24F 12/001; F24F 7/06; F24F 7/08; F24F 7/10; F24F 11/0001; F24F 2011/0002; F24F 11/63; F24F 11/62
(Continued)

(56) References Cited

U.S. PATENT DOCUMENTS

| | | | |
|---|---|---|---|
| 5,119,987 A | 6/1992 | Kobayashi | |
| 2007/0068509 A1* | 3/2007 | Bagwell | F24F 11/30 126/299 D |

(Continued)

FOREIGN PATENT DOCUMENTS

| | | |
|---|---|---|
| EP | 1132690 A1 | 9/2001 |
| JP | H10-141720 A | 5/1998 |

(Continued)

OTHER PUBLICATIONS

Office Action dated Jun. 2, 2020 issued in corresponding JP patent application No. 2019-512067 (and English translation).

(Continued)

*Primary Examiner* — Vivek K Shirsat
*Assistant Examiner* — Ko-Wei Lin
(74) *Attorney, Agent, or Firm* — Posz Law Group, PLC

(57) ABSTRACT

A control unit determines, on the basis of a temperature and humidity detected by sensors, whether outdoor air cooling that takes outdoor air into a room is effective. Upon determination that the outdoor air cooling is effective, the control unit opens a damper and causes stoppage of an air supply fan disposed in an air supply path. Due to such operation, indoor air passing through an air discharge path bypasses a total heat exchanger by passing through a bypass air path, and thereby is discharged to the outdoors as exhaust air. However, due to stoppage of the air supply fan, although the outdoor air does not flow through the air supply path, the outdoor air flows into a building from an opening of the building.

6 Claims, 16 Drawing Sheets

(58) Field of Classification Search
USPC .................. 454/229, 235, 239, 251–252
See application file for complete search history.

(56) References Cited

U.S. PATENT DOCUMENTS

| | | | |
|---|---|---|---|
| 2008/0003940 A1 | 1/2008 | Haglid | |
| 2008/0250800 A1 | 10/2008 | Wetzel | |
| 2010/0078492 A1* | 4/2010 | Cislo | F24F 7/06 |
| | | | 236/49.3 |
| 2010/0286831 A1* | 11/2010 | Boudreau | F24F 12/006 |
| | | | 700/278 |
| 2012/0216982 A1* | 8/2012 | Lee | F24F 12/006 |
| | | | 165/11.1 |
| 2013/0048267 A1* | 2/2013 | Koretomo | F24F 11/81 |
| | | | 165/300 |
| 2016/0290675 A1* | 10/2016 | Hashino | F24F 12/006 |
| 2016/0370029 A1* | 12/2016 | Kurelowech | F24F 13/10 |
| 2017/0051940 A1* | 2/2017 | Horie | F24F 3/001 |
| 2019/0293319 A1* | 9/2019 | Okeya | F24F 11/0001 |

FOREIGN PATENT DOCUMENTS

| | | |
|---|---|---|
| JP | H11-230600 A | 8/1999 |
| JP | 2001-056146 A | 2/2001 |
| JP | 2009-109090 A | 5/2009 |
| JP | 2009-236387 A | 10/2009 |
| WO | 2015/173910 A1 | 11/2015 |

OTHER PUBLICATIONS

Office Action dated Sep. 29, 2020 issued in corresponding CN patent application No. 201780089094.6 (and English translation).
Extended European Search Report dated Jun. 17, 2020 issued in corresponding EP patent application No. 17905423.4.
International Search Report dated Jun. 27, 2017 issued in the corresponding International Application No. PCT/JP2017/014708 (and English translation).
Office Action dated Apr. 9, 2021 issued in the corresponding CN patent application No. 201780089094.6 (and the English translation).

* cited by examiner

AIR CONDITIONING VENTILATION DEVICE, AIR CONDITIONING SYSTEM, AND CONTROL METHOD

CROSS REFERENCE TO RELATED APPLICATION

This application is a U.S. national stage application of PCT/JP2017/014708 filed on Apr. 10, 2017, the contents of which are incorporated herein by reference.

TECHNICAL FIELD

The present disclosure relates to an air conditioning ventilation device, an air conditioning system, and a control method that are capable of appropriately increasing energy-saving performance occurring during outdoor air cooling.

BACKGROUND ART

Air conditioning systems are installed heretofore in structures such as buildings. Such air conditioning systems include a ventilation device equipped, for example, with a heat exchanger (total heat exchanger or sensible heat exchanger) and enable a lowering of air conditioning load that occurs when replacing indoor air with outdoor air (fresh air). For example, in the summer, although an indoor temperature greatly rises if high temperature outdoor air is taken in as is, heat exchange with the indoor air by the heat exchanger of the ventilation device cools outdoor air that is supplied to an indoor space. Such operation therefore suppresses the rise of the indoor temperature and lowers the air conditioning load.

An invention of an air conditioning system equipped with such a ventilation device is disclosed, for example, in Patent Literature 1. According to this invention, when the outdoor temperature is lower than the indoor temperature as in an intermediate period (spring or fall), the heat exchanger is bypassed, and the low temperature outdoor air is taken as is into the indoor space, thereby obtaining an outdoor air cooling effect. Such operation lowers the air conditioning load of the air conditioning system and causes in increase in the energy-saving performance.

CITATION LIST

Patent Literature

Patent Literature 1: Unexamined Japanese Patent Application Kokai Publication No. H11-230600

SUMMARY OF INVENTION

Technical Problem

However, in accordance with the aforementioned invention of Patent Literature 1, a ventilation air flow rate is to be increased to a certain degree in order to increase the outdoor air cooling effect. That is to say, in practice during outdoor air cooling, a blown air flow rate of the fan is increased in the ventilation device, and therefore such increase results in an increase in power consumption. Therefore, even when the decrease in the air conditioning load is considered, such operation is not particularly effective for increasing the energy-saving performance.

Technology is therefore needed that enables suitable improvement in the energy-saving performance during the outdoor air cooling.

In order to solve problems such as those described above, an object of the present disclosure is to suitably improve the energy-saving performance during the outdoor air cooling.

Solution to Problem

In order to attain the aforementioned objective, an air conditioning ventilation device according to the present disclosure includes:

a first air path having first air-blowing means disposed therein and configured to supply outdoor air to an indoor space;

a second air path having second air-blowing means disposed therein and configured to discharge to outdoors indoor air from the indoor space;

heat exchange means for performing heat exchange between air passing through the first air path and air passing through the second air path;

a bypass air path connecting with either the first air path or the second air path and configured to bypass the heat exchange means;

air path switching means for opening and closing the bypass air path to switch an air path through which air passes; and control means for controlling the first air-blowing means and the second air-blowing means and controlling the air path switching means, wherein the control means, during outdoor air cooling that takes outdoor air into the indoor space, controls the air path switching means to open the bypass air path, and causes stoppage of the air-blowing means disposed in an air path in which the bypass air path is not formed.

Advantageous Effects of Invention

According to the present disclosure, during the outdoor air cooling, the control means controls the air path switching means to open the bypass air path, and also causes stoppage of the air-blowing means that is disposed in the air path in which the bypass air path is not formed. Such operation results in enablement of suitable improvement in the energy-saving performance occurring during the outdoor air cooling.

DESCRIPTION OF EMBODIMENTS

Figure 1:
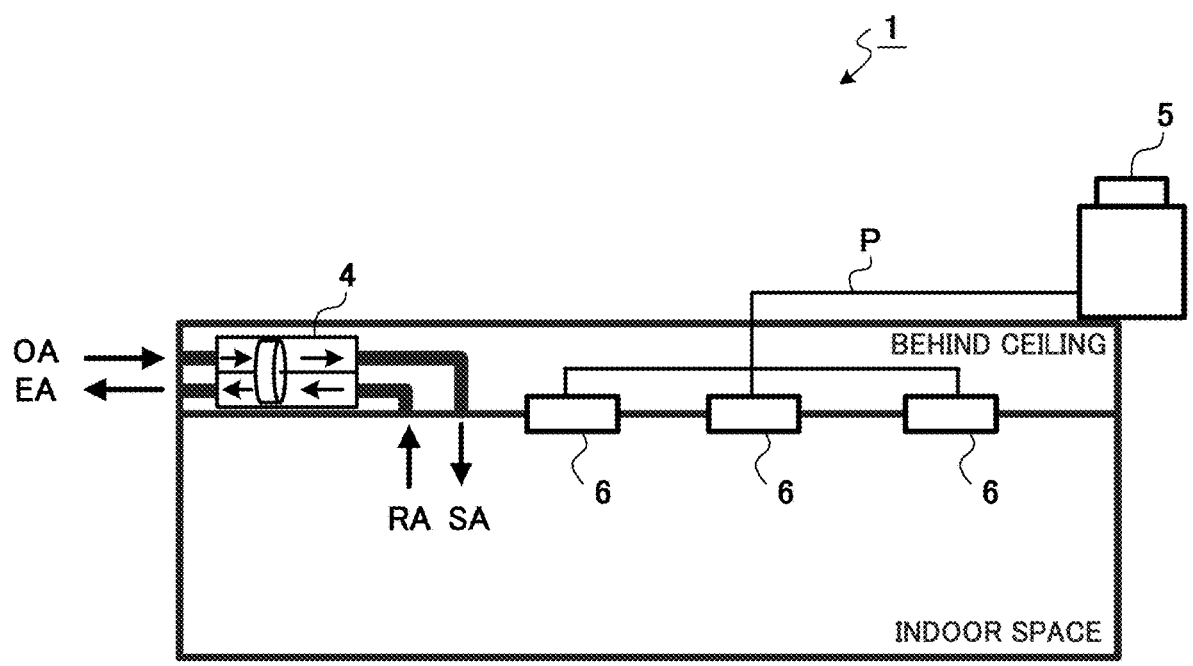
FIG. 1 is a schematic drawing illustrating an example of overall configuration of an air conditioning system according to Embodiment 1 of the present disclosure.

Embodiments of the present disclosure are described below in detail with reference to drawings. In the drawings, components that are the same or equivalent are assigned the same reference sign. Although the present disclosure is described for a case of using an air conditioning ventilation device (air conditioning system) having ventilation as a main function, the present disclosure can be used also in the same manner for an air conditioning device having air conditioning as the main function. That is to say, embodiments for description are described below, and the below description does not limit the scope of the present disclosure. Thus, one skilled in the art can substitute an equivalent for each or all these elements of these embodiments and such embodiments are included in the scope of the present disclosure.

Embodiment 1

FIG. 1 is a schematic drawing illustrating an example of overall configuration of an air conditioning system 1 according to Embodiment 1 of the present disclosure. This air conditioning system 1 is installed in a structure such as a building, and as illustrated, is configured to include an air conditioning ventilation device 4, an outdoor unit 5, and multiple indoor units 6. The outdoor unit 5 and the multiple indoor units 6 are connected via piping P. Further, the numbers of the outdoor units 5 and the indoor units 6 are examples, and these numbers can be changed appropriately in accordance with floor area of the structure (floor).

The air conditioning ventilation device 4, for example, is installed behind a ceiling of the structure, and exchanges indoor air and outdoor air. That is to say, the air conditioning ventilation device 4 supplies into the indoor space outdoor air OA as supply air SA, and discharges indoor air RA as exhaust air EA to the outdoors. External visual configuration of the air conditioning ventilation device 4 is described below with reference to FIG. 2.

Figure 2:
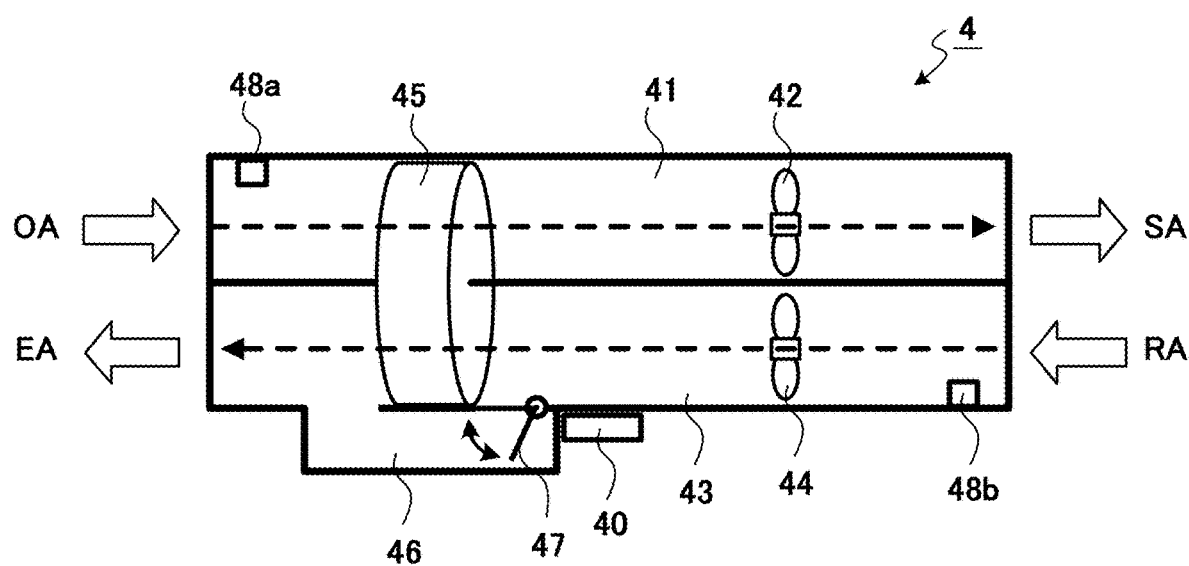
FIG. 2 is a schematic drawing for description of external visual configuration of an air conditioning ventilation device.

FIG. 2 is a schematic drawing for description of the external visual configuration of the air conditioning ventilation device 4. As illustrated, the air conditioning ventilation device 4 is configured to include: a control unit 40 as control means, an air supply path 41 as a first air path, an air supply fan 42 as first air-blowing means, an air discharge path 43 as a second air path, an exhaust fan 44 as second air-blowing means, a total heat exchanger 45 as heat exchange means, a bypass air path 46, a damper 47 as air path switching means, and sensors 48 (48a, 48b).

The control unit 40 performs overall control of the air conditioning ventilation device 4. Furthermore, details of the control unit 40 are described together with the below-mentioned FIG. 3.

The air supply path 41 is an air path for suppling to the indoor space the outdoor air OA as the supply air SA, and an air supply fan 42 is disposed therein. This air supply fan 42 is controlled by the control unit 40 to run (rotate) and take the outdoor air OA into the air supply path 41.

The air discharge path 43 is an air path for discharge of the indoor air RA as the exhaust air EA to the outdoors, and has the exhaust fan 44 arranged therein. This exhaust fan 44 is controlled by the control unit 40 to be driven and take the indoor air RA into the air discharge path 43.

The total heat exchanger 45 performs total heat exchange between the outdoor air OA passing through the air supply path 41 and the indoor air RA passing through the air discharge path 43. The outdoor air OA after the total heat exchange is supplied to the indoor space as the supply air SA, while the indoor air RA after the total heat exchange is discharged outdoors as the exhaust air EA. Furthermore, a sensible heat exchanger may be used in place of the total heat exchanger 45.

The bypass air path 46 is formed by connection to the air discharge path 43, and can be used as an air path for circumventing the total heat exchanger 45 by the indoor air RA passing through the air discharge path 43. Furthermore, the bypass air path 46 is formed such that air path resistance during passage of air through the bypass air path 46 is low (for example, one half) in comparison to air path resistance during passage through the total heat exchanger 45.

The damper 47 is arranged in a connecting part of either this bypass air path 46 or the air discharge path 43 (for example, in the indoor-side connecting part). This damper 47 opens and closes under control of the control unit 40 and switches the air path of the indoor air RA passing through the air discharge path 43. That is to say, when the damper 47 is closed, the indoor air RA passes through the total heat exchanger 45. However, when the damper 47 is opened, the indoor air RA passes through the bypass air path 46, that is, bypasses the total heat exchanger 45.

Furthermore, although a case is explained in Embodiments 1 to 3 of the present disclosure in which the bypass air path 46 is formed by connection with the air discharge path 43, this configuration is an example, and the bypass air path 46 may be formed by connection with the air supply path 41. In this case, the bypass air path 46 is used as an air path for the outdoor air OA passing through the air supply path 41 to bypass the total heat exchanger 45.

The sensors 48 (48a, 48b) are, for example, temperature and humidity sensors and are disposed in the air supply path 41 (for example, near the outdoor side) and the air discharge path 43 (for example, near the indoor side). The sensor 48a detects temperature and humidity of the outdoor air OA passing through the air supply path 41, and such data is supplied to the control unit 40 as a detection result. In contrast, the sensor 48b detects temperature and humidity of the indoor air RA passing through the air discharge path 43, and such data is supplied to the control unit 40. Furthermore, the sensors 48 may be temperature sensors that only detect temperature.

Figure 3:
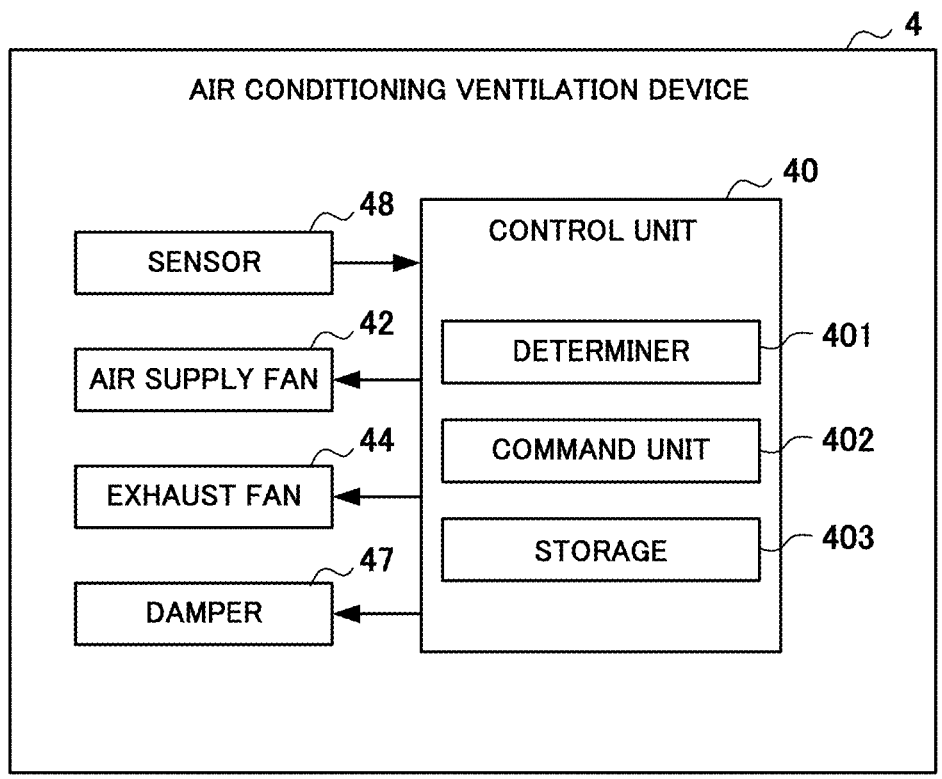
FIG. 3 is a schematic drawing for description of connection configuration of the air conditioning ventilation device.

The control unit 40 of the air conditioning ventilation device 4 is next mainly described with reference to FIG. 3. FIG. 3 is a block diagram for description of connection configuration of the air conditioning ventilation device 4. As illustrated, the control unit 40 is configured to include a determiner 401 as determination means, a command unit 402, and a storage 403. The control unit 40, for example, is configured from a central processing unit (CPU), a read only memory (ROM), a random access memory (RAM), or the like. The determiner 401 and the command unit 402, for example, are realized by the CPU using the RAM as working memory to appropriately execute various types of programs stored in the ROM.

The determiner 401, on the basis of the detection result of the sensors 48, determines whether the outdoor air cooling that takes the outdoor air OA into the indoor space is effective. For example, the determiner 401 compares outdoor air enthalpy determined from the temperature and humidity of the outdoor air OA detected by the sensor 48a with indoor air enthalpy determined from the temperature and humidity of the indoor air RA detected by the sensor 48b. Then in the case in which the outdoor air enthalpy is lower than the indoor air enthalpy, the determiner 401 determines that the outdoor air cooling is effective. In the case of the opposite determination, the determiner 401 determines that the outdoor air cooling is ineffective. Further, in the case in which the air conditioning ventilation device 4 (control unit 40) obtains the operational state of the indoor unit 6, the basis of the determiner 401 determining whether the outdoor air cooling is effective includes whether the indoor unit 6 is performing a cooling operation, that is, whether a cooling load is being generated. That is to say, the determiner 401 determines that the outdoor air cooling is effective only when the outdoor air enthalpy is lower than the indoor air enthalpy and the cooling load is generated.

The command unit 402 sends commands to be executed, for example, to an actuator for driving the damper 47, a motor driver for rotating the air supply fan 42, and a motor driver for rotating the exhaust fan 44. Specifically, upon the determiner 401 determining that the outdoor air cooling is effective, the command unit 402 sends a command for performance of the outdoor air cooling. That is to say, the command unit 402 sends an opening command to the actuator of the damper 47 to open the damper 47, and sends a stoppage command to the motor driver of the air supply fan 42 to cause stoppage of the air supply fan 42. Further, the command unit 402 may cause an increase in an air flow rate of the exhaust fan 44 by sending a strong rotation command to the motor driver of the exhaust fan 44.

Figure 4:
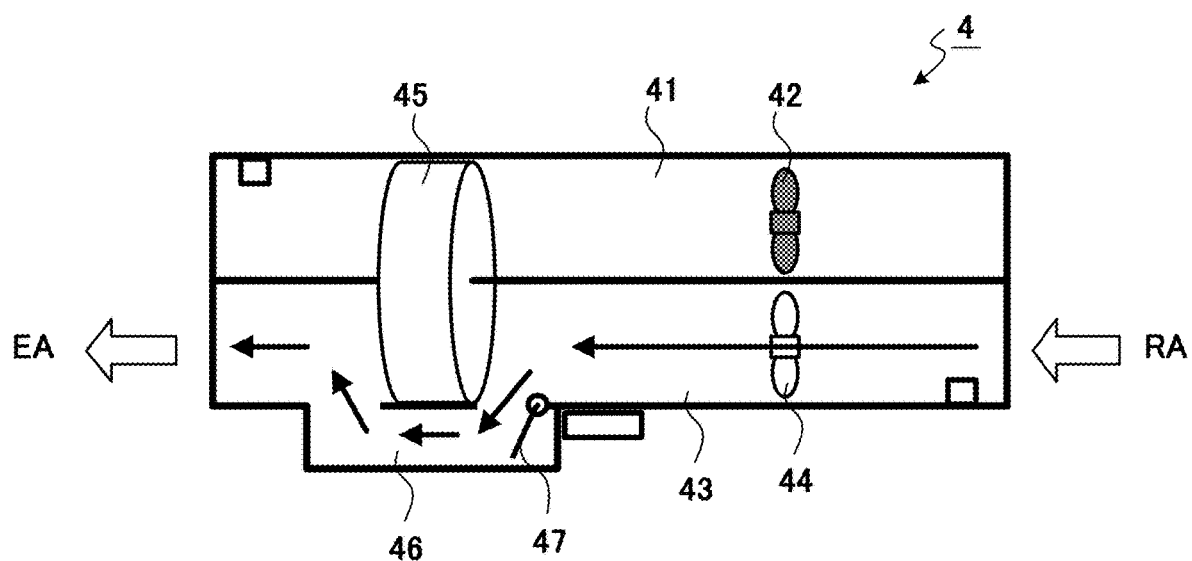
FIG. 4 is a schematic drawing for description of flow of indoor air occurring during outdoor air cooling.

Upon the start of the outdoor air cooling in this manner, in the air conditioning ventilation device 4 as illustrated in FIG. 4, the damper 47 is opened, and the indoor air RA passing through the air discharge path 43 passes through the bypass air path 46 (bypasses the total heat exchanger 45) and is discharged outdoors as the exhaust air EA. However, due to stoppage of the air supply fan 42, the outdoor air OA does not flow in the air supply path 41.

Figure 5:
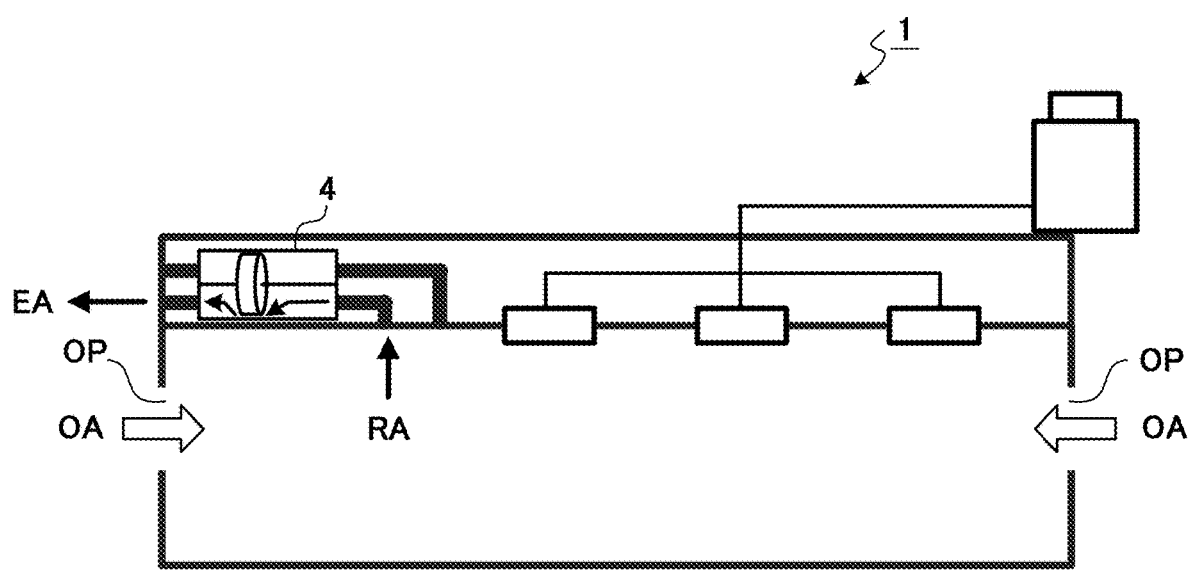
FIG. 5 is a schematic drawing for description of flow of outdoor air occurring during the outdoor air cooling.

As illustrated in FIG. 5, the outdoor air OA passes through an opening OP such as a window or door, and flows into the indoor space. That is to say, due to the air conditioning ventilation device 4 discharging the indoor air RA as the exhaust air EA to the outdoors, the outdoor air OA passes through the opening OP and flows into the indoor space.

Again with reference to FIG. 3, the storage 403 stores various types of information required for control of the air conditioning ventilation device 4. For example, the storage 403 stores programs for execution of below-described outdoor air cooling control processing.

Again with reference to FIG. 1, the outdoor unit 5, for example, has a compressor and a heat source-side heat exchanger, and is connected to the indoor unit 6 via the piping P. Then refrigerant is made to circulate between the outdoor unit 5 and the indoor unit 6 via such piping P. Further, the outdoor unit 5 is installed outdoors, such as on a roof of the structure.

The indoor unit 6, for example, has an expansion valve and a load-side heat exchanger, and is connected to the outdoor unit 5 via the piping P. Further, the indoor unit 6 performs air conditioning by causing the load-side heat exchanger to perform evaporation or condensation of the refrigerant sent via such piping P from the outdoor unit 5. This indoor unit 6, for example, is installed by embedment in ceiling slabs of the structure (floor).

Figure 6:
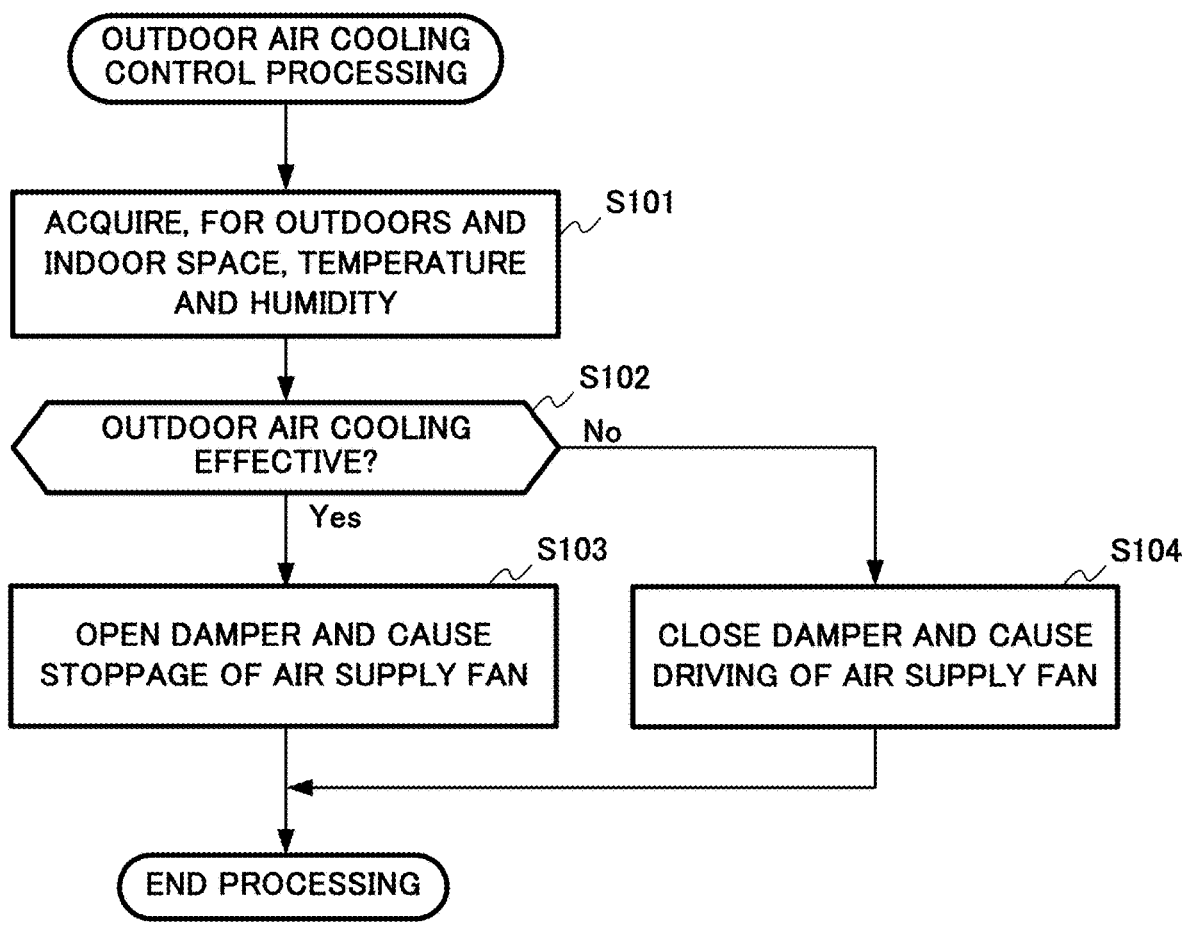
FIG. 6 is a flowchart illustrating an example of outdoor air cooling control processing.

Operation of the air conditioning ventilation device 4 of the air conditioning system 1 is described below with reference to FIG. 6. FIG. 6 is a flowchart illustrating an example of the outdoor air cooling control processing executed by the air conditioning ventilation device 4 (control unit 40). This outdoor air cooling control processing, for example, is executed repeatedly upon each passage of a fixed period.

Firstly, the control unit 40 acquires the outdoor and the indoor temperature and humidity values (step S101). That is to say, the control unit 40 acquires the outdoor air OA temperature and humidity from the sensor 48a, and acquires the indoor air RA temperature and humidity from the sensor 48b.

The control unit 40 determines whether the outdoor air cooling is effective (step S102). That is to say, on the basis of the temperature and humidity values acquired in step S101, the determiner 401 determines whether the outdoor air cooling is effective. For example, the determiner 401 compares the outdoor air enthalpy found from the temperature and humidity of the outdoor air OA with the indoor air enthalpy found from the temperature and humidity of the indoor air RA. Then in the case in which the outdoor air enthalpy is lower than the indoor air enthalpy, the determiner 401 determines that the outdoor air cooling is effective. However, in the case of the opposite relationship between the enthalpies, the determiner 401 determines that the outdoor air cooling is ineffective. Furthermore, as described above, in the case in which the operational state of the indoor unit 6 is obtained, the basis for determination of the outdoor air cooling by the determiner 401 includes whether the indoor unit 6 is performing the cooling operation, that is, whether the cooling load is being generated. That is to say, the determiner 401 determines that the outdoor air cooling is effective only when the outdoor air enthalpy is lower than the indoor air enthalpy and the cooling load is being generated.

Upon determination that the outdoor air cooling is effective (YES in step S102), the control unit 40 opens the damper 47 and causes stoppage of the air supply fan 42 (step S103). That is to say, the command unit 402 sends an opening command to the actuator that drives the damper 47, and together with the opening of the damper 47, causes stoppage of the air supply fan 42 by sending a stoppage command to the motor driver that causes rotation of the air supply fan 42. Furthermore, the command unit 402 may send a strong rotation command to the motor driver for causing rotation of the exhaust fan 44 to cause an increase in the air flow rate of the exhaust fan 44.

Furthermore, if the outdoor air cooling is already in progress (if the damper 47 is already opened or the air supply fan 42 is already stopped), the control unit 40 skips the processing of step S103 and ends the outdoor air cooling control processing.

Upon the start of the outdoor air cooling in this manner, as illustrated in the aforementioned FIG. 4, in the air conditioning ventilation device 4, the damper 47 opens, and the indoor air RA passing through the air discharge path 43 passes through the bypass air path 46 (bypasses the total heat exchanger 45) and is discharged outdoors as the exhaust air EA. However, due to stoppage of the air supply fan 42, the outdoor air OA does not flow in the air supply path 41.

As illustrated in the aforementioned FIG. 5, the outdoor air OA passes through the opening OP and flows into the indoor space. That is to say, due to the air conditioning ventilation device 4 discharging outdoors the indoor air RA as the exhaust air EA, the outdoor air OA passes through the opening OP and flows into the indoor space.

However, in the case of determination in the aforementioned step S102 that the outdoor air cooling is not effective (is ineffective) (NO in step S102), the control unit 40 closes the damper 47 and causes driving (rotation) of the air supply fan 42 (step S104). That is to say, together with the sending of the closing command to the actuator to cause driving of the damper 47 and closing of the damper 47, the command unit 402 sends a rotation command to the motor driver for causing rotation of the air supply fan 42 and causes driving of the heretofore stopped air supply fan 42. Further, in the case in which the air flow rate of the exhaust fan 44 is being made to increase, the command unit 402 sends a rotation restitution command to the motor driver that rotates the exhaust fan 44 to cause restitution of the exhaust fan 44 air flow rate.

Furthermore, if the outdoor air cooling is not in progress (if the damper 47 is closed or driving of the air supply fan 42 is stopped), the control unit 40 skips the processing of step S104 and ends the outdoor air cooling control processing.

In this manner, the air supply fan 42, that is, bypass blowing means disposed in the air path in which the bypass air path 46 is not formed, is stopped during the outdoor air cooling, and thus blown air mobility can be lowered. Even if the ventilation air flow rate of the exhaust fan 44 (that is, air-blowing means disposed in the air path in which the bypass air path 46 is formed) is increased in order to improve the outdoor air cooling effect during the outdoor air cooling, due to stoppage of the air supply fan 42, the blown air mobility of the air conditioning ventilation device 4 does not increase overall in comparison to prior to the outdoor air cooling. This result can cause a suitable improvement in the energy-saving performance during the outdoor air cooling.

Embodiment 2

Although a case is described in the aforementioned Embodiment 1 in which the opening OP can be used as illustrated in FIG. 5, such an opening OP cannot be used in the case in which the window, door, or the like are all closed. A configuration may thus be used that performs system-side opening-closing control of the window, door, or the like. Embodiment 2 of the present disclosure is described below.

Figure 7:
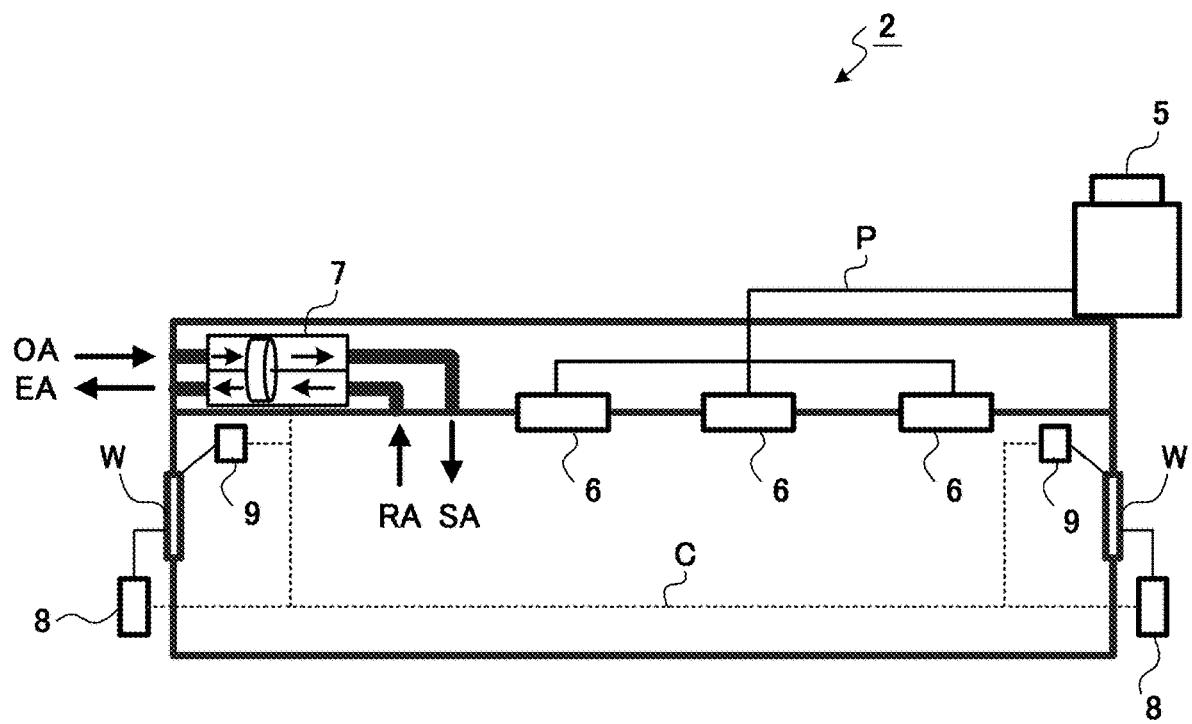
FIG. 7 is a schematic drawing illustrating an example of overall configuration of an air conditioning system according to Embodiment 2 of the present disclosure.

FIG. 7 is a schematic drawing illustrating an example of overall configuration of an air conditioning system 2 according to Embodiment 2 of the present disclosure. As illustrated in the drawing, this air conditioning system 2 is configured to include an air conditioning ventilation device 7, the outdoor unit 5, multiple indoor units 6, multiple opening-closing mechanisms 8, and multiple opened-closed sensors 9. Further, the outdoor unit 5 and the indoor units 6 are similar to such units of the air conditioning system 1 of FIG. 1. Moreover, the air conditioning ventilation device 7, the opening-closing mechanisms 8, and the opened-closed sensors 9 are communicatively connected via a communication line C. Further, the numbers of the opening-closing mechanisms 8 and the opened-closed sensors 9 are examples, and such numbers can be changed appropriately.

The opening-closing mechanism 8, as opening-closing means, is controlled by the air conditioning ventilation device 7 through the communication line C, and opens and closes a door member W, such as a window, door, or the like, arranged in the structure. Furthermore, the opening-closing mechanism 8 may be capable of opening and closing the door member W also in reaction to manual operation by a user.

The opened-closed sensor 9 detects the opened-closed condition of the door member W and provides notification to the air conditioning ventilation device 7 via the communication line C.

Figure 8:
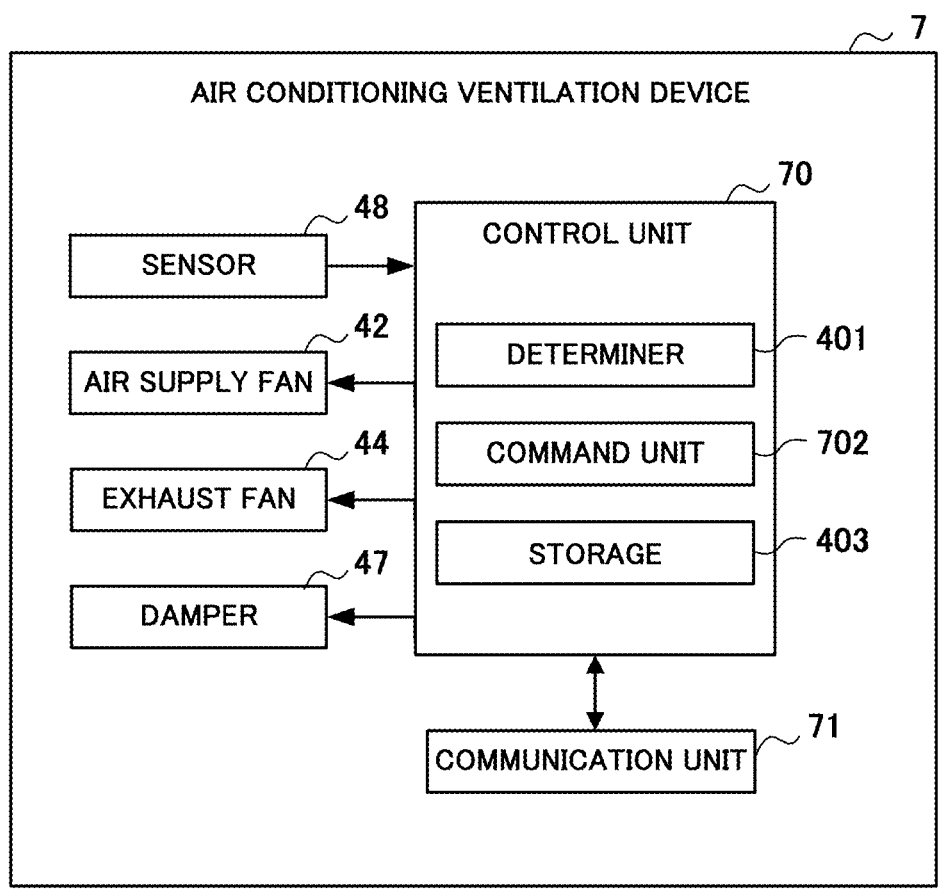
FIG. 8 is a schematic drawing for description of connection configuration of the air conditioning ventilation device.

FIG. 8 is a block diagram for description of connection configuration of the air conditioning ventilation device 7. Further, external visual configuration of the air conditioning ventilation device 7 is similar to that of the aforementioned air conditioning ventilation device 4 of FIG. 3. As illustrated in FIG. 8, a control unit 70 is configured to include the determiner 401, a command unit 702, and the storage 403. Further, the determiner 401 and the storage 403 are similar to such components of the air conditioning ventilation device 4 of FIG. 3.

Moreover, the air conditioning ventilation device 7 is further equipped with a communication unit 71. This communication unit 71 is controlled by the control unit 70 and performs communication with the opening-closing mechanism 8 and the opened-closed sensor 9.

Rather than sending commands to just the air supply fan 42, the exhaust fan 44, and the damper 47, via the communication unit 71, the command unit 702 also sends commands to the opening-closing mechanism 8. For example, in the case in which the outdoor air cooling is determined to be effective by the determiner 401, the command unit 702 can cause opening of the door member W by transmitting an opening command to the opening-closing mechanism 8 through the communication unit 71. Moreover, due to the communication unit 71 acquiring the opened-closed condition of the door member W by communication with the opened-closed sensor 9, the command unit 702 can also refer to the opened-closed condition of the door member W.

Figure 9:
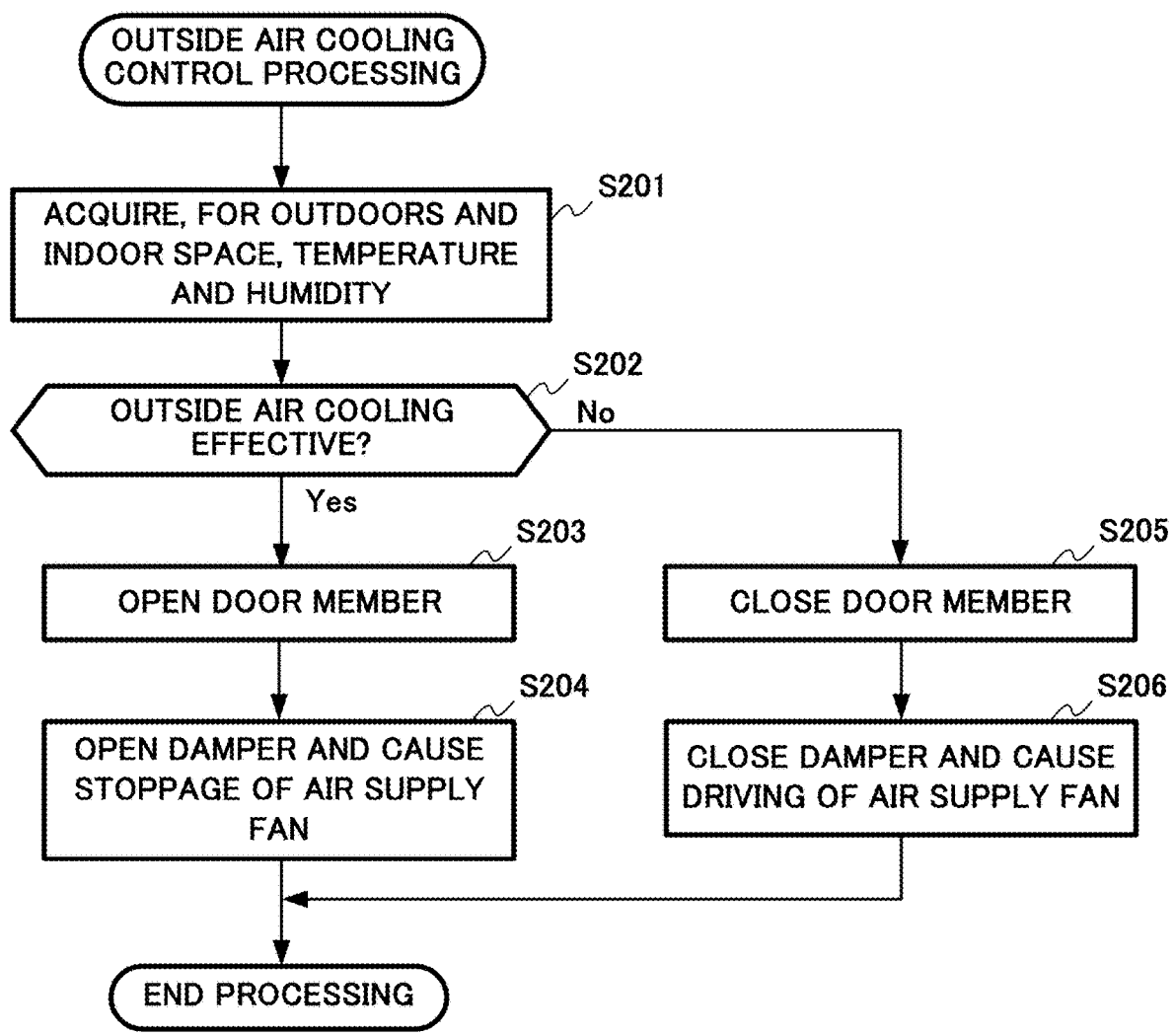
FIG. 9 is a flowchart illustrating an example of the outdoor air cooling control processing.

Operation of the air conditioning ventilation device 7 of the air conditioning system 2 is described below with reference to FIG. 9. FIG. 9 is a flowchart illustrating an example of the outdoor air cooling control processing executed by the air conditioning ventilation device 7 (control unit 70). Such outdoor air cooling control processing is executed repeatedly upon each passage of a fixed period.

Firstly, the control unit 70 acquires the outdoor and the indoor temperature and humidity values (step S201). That is to say, the control unit 70 acquires the temperature and humidity of the outdoor air OA from the sensor 48a and the temperature and humidity of the indoor air RA from the sensor 48b.

The control unit 70 determines whether the outdoor air cooling is effective (step S202). For example, the determiner 401 compares the outdoor air enthalpy found from the temperature and humidity of the outdoor air OA with the indoor air enthalpy found from the temperature and humidity of the indoor air RA, and in the case in which the outdoor air enthalpy is lower than the indoor air enthalpy, the determiner 401 determines that the outdoor air cooling is effective. Further, as described above, in the case in which the operational state of the indoor unit 6 is obtained, the determiner 401 determines that the outdoor air cooling is effective only when the outdoor air enthalpy is lower than the indoor air enthalpy and the cooling load is being generated.

Upon determination that the outdoor air cooling is effective (YES in step S202), the control unit 70 opens the door member W (step S203). That is to say, the command unit 702 sends an opening command to the opening-closing mechanism 8 through the communication unit 71 and causes the door member W to open. Further, if the door member W is detected by the opened-closed sensor 9 to already be opened, the control unit 70 skips the processing of step S203.

The control unit 70 opens the damper 47 and also causes stoppage of the air supply fan 42 (step S204). That is to say, in addition to opening the damper 47 by sending the opening command to the actuator for driving the damper 47, the command unit 702 causes stoppage of the air supply fan 42 by sending the stoppage command to the motor driver that causes rotation of the air supply fan 42. Furthermore, the command unit 702 may send a strong rotation command to the motor driver for rotation of the exhaust fan 44 and may cause an increase in the exhaust fan 44 air flow rate.

Furthermore, if the outdoor air cooling is already in progress (if the damper 47 is opened, or the air supply fan 42 is stopped), then the control unit 70 skips the processing of step S204 and ends the outdoor air cooling control processing.

However, in the case of determination in the aforementioned step S202 that the outdoor air cooling is not effective (is ineffective) (NO in step S202), the control unit 70 closes the door member W (step S205). That is to say, the command unit 702 sends a closing command to the opening-closing mechanism 8 through the communication unit 71 and closes the door member W. Upon detection by the opened-closed sensor 9 that the door member W is already closed, the control unit 70 skips the processing of step S205.

The control unit 70 causes, together with the closing of the damper 47, driving of the air supply fan 42 (step S206). That is to say, in addition to closing the damper 47 by sending the closing command to the actuator that drives the damper 47, the command unit 702 causes driving of the air supply fan 42 by sending the rotation command to the motor driver that rotates the air supply fan 42. Further, in the case in which the exhaust fan 44 air flow rate is increased, the command unit 702 transmits the rotation restitution command to the motor driver that rotates the exhaust fan 44 to cause restitution of the exhaust fan 44 air flow rate.

Further, if the outdoor air cooling is not in progress (if the damper 47 is closed or the air supply fan 42 is already driven), the control unit 70 skips the processing of step S206 and ends the outdoor air cooling control processing.

Due to stoppage of the air supply fan 42 during the outdoor air cooling in this manner, blown air mobility can be lowered. Moreover, due to improvement of the outdoor air cooling effect during the outdoor air cooling, even if the ventilation air flow rate of the exhaust fan 44 is made to increase, the air supply fan 42 is stopped, and thus the blown air mobility of the air conditioning ventilation device 7 does not increase overall in comparison to prior to the outdoor air cooling. As a result, the energy-saving performance during the outdoor air cooling can be suitably increased. Moreover, even if the door member W is closed, the door member W can be reliably opened together with the start of the outdoor air cooling.

Embodiment 3

Although a case is described in the aforementioned Embodiments 1 and 2 in which the air conditioning ventilation devices 4 and 7 perform control of the outdoor air cooling, a control device (controller) that controls the overall system may perform the control of the outdoor air cooling. Embodiment 3 of the present disclosure is described below.

Figure 10:
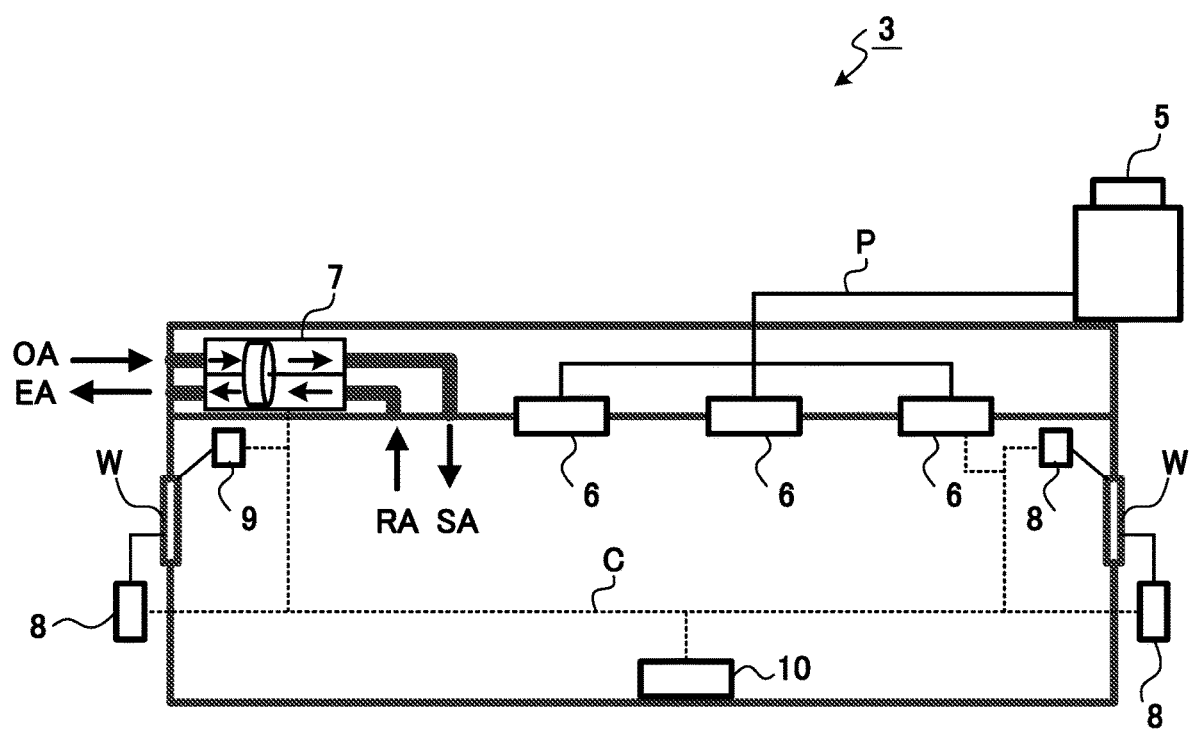
FIG. 10 is a schematic drawing illustrating an example of overall configuration of an air conditioning system according to Embodiment 3 of the present disclosure.

FIG. 10 is a schematic drawing illustrating an example of overall configuration of an air conditioning system 3 according to Embodiment 3 of the present disclosure. As illustrated in the drawing, the air conditioning system 3 is configured to include the air conditioning ventilation device 7, the outdoor unit 5, the multiple indoor units 6, the multiple opening-closing mechanisms 8, the multiple opened-closed sensors 9, and a control device 10. Furthermore, the air conditioning ventilation device 7, the outdoor unit 5, the indoor units 6, the opening-closing mechanisms 8, and the opened-closed sensors 9 are similar to such components of the air conditioning system 2 of FIG. 7. However, the aforementioned determiner 401 illustrated in FIG. 8 is omitted from the air conditioning ventilation device 7. Moreover, the air conditioning ventilation device 7, the indoor units 6, the opening-closing mechanisms 8, the opened-closed sensors 9, and the control device 10 are communicatively connected via the communication line C.

Figure 11:
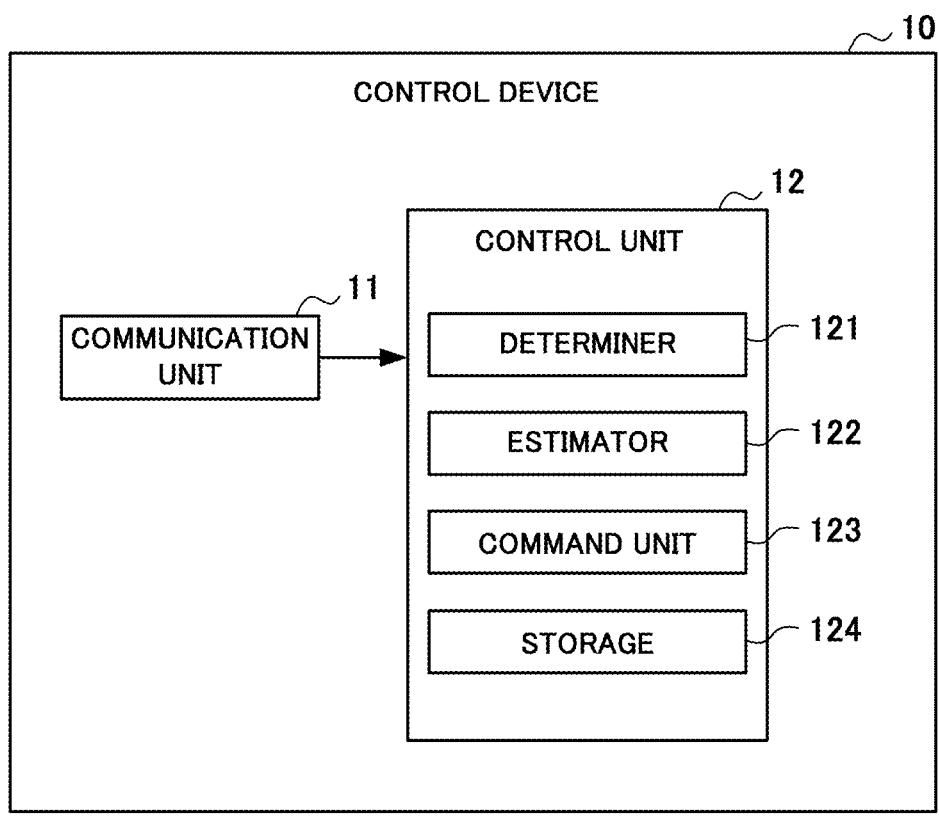
FIG. 11 is a schematic drawing for description of configuration of a control device.

FIG. 11 is a block diagram for description of configuration of the control device 10. As illustrated in the diagram, the control device 10 is configured to include a communication unit 11 and a control unit 12.

The communication unit 11 performs communication with the air conditioning ventilation device 7, the indoor units 6, the opening-closing mechanisms 8, and the opened-closed sensors 9 via the communication line C. For example, the communication unit 11 communicates with the air conditioning ventilation device 7 and thus acquires the temperature and humidity detected by the sensors 48 (sensors 48*a* and 48*b*). Moreover, the communication unit 11 communicates with the indoor units 6 and thus acquires the operational states of the indoor units 6, such as whether the cooling load is being generated, for example. Furthermore, the communication unit 11 sends commands to be executed to the air conditioning ventilation device 7 and the opening-closing mechanisms 8.

The control unit 12 is configured to include a determiner 121 as determination means, an estimator 122 as estimation means, a command unit 123, and a storage 124. The control unit 12 is configured from components such as the CPU, the ROM, the RAM, or the like, for example. The determiner 121, the estimator 122, and the command unit 123 are achieved, for example, by the CPU using the RAM as working memory to appropriately execute various types of programs stored in the ROM.

The determiner 121 determines whether the outdoor air cooling is effective on the basis of the temperature and humidity according to the sensors 48 and acquired by the communication unit 11 from the air conditioning ventilation device 7. For example, the determiner 121 compares the outdoor air enthalpy found from the temperature and humidity of the outdoor air OA detected by the sensor 48*a* with the indoor air enthalpy found from the temperature and humidity of the indoor air RA detected by the sensor 48*b*. Then the outdoor air cooling is determined to be effective as long as the outdoor air enthalpy is lower than the indoor air enthalpy, and the cooling load is not being generated by the indoor units 6.

The estimator 122 estimates a power increase amount (ventilation blown air mobility increase amount) $\Delta Wf$ of the air conditioning ventilation device 7 and a power reduction amount (air conditioning-side power reduction amount) $\Delta W\_i$ of the indoor units 6 and the outdoor unit 5, and sets a ventilation air flow rate Va1 that results in a highest energy-saving effect. Hereinafter, the procedures of the estimator 122 up until the determination of the ventilation air flow rate Va1 are described below with reference to FIGS. 12 to 15.

In the outdoor air cooling, although the air supply fan 42 of the air conditioning ventilation device 7 stops and only the exhaust fan 44 is driven, the rotation rate of the exhaust fan 44, that is, the ventilation air flow rate Va of the command, can at that time be freely selected by the air conditioning ventilation device 7.

Figure 12:
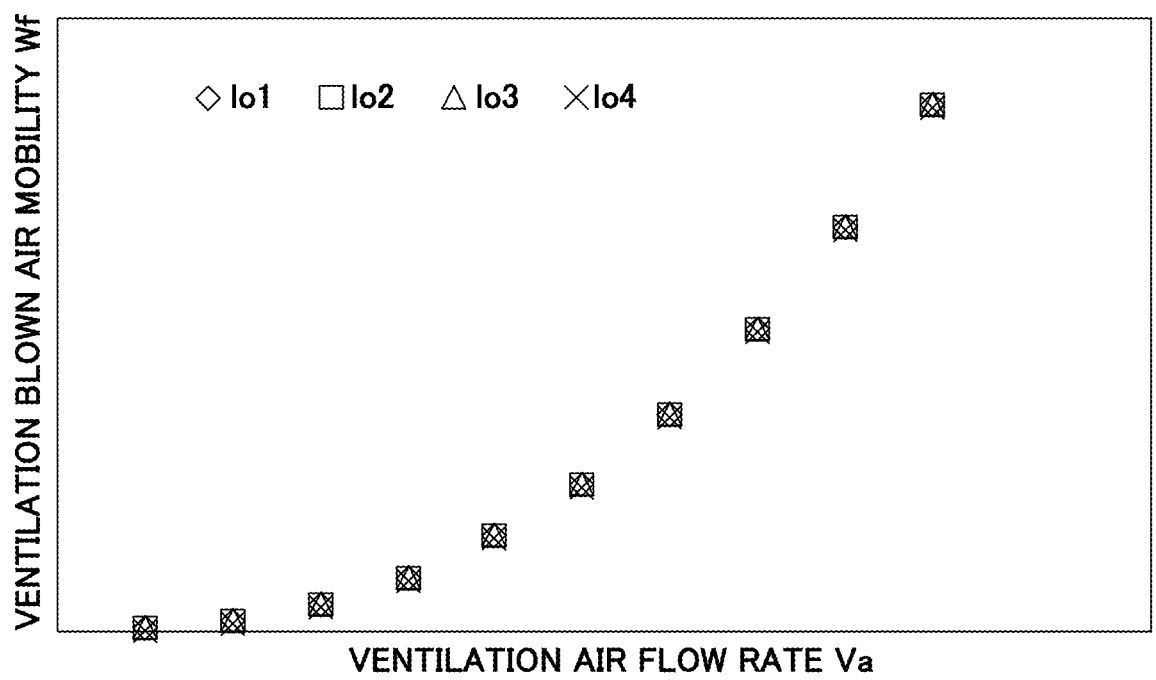
FIG. 12 is a graph illustrating a relationship between ventilation air blowing capacity and ventilation air flow rate.

At this time, a relationship between the power consumption of the exhaust fan 44 (that is, the ventilation blown air mobility Wf) and the ventilation air flow rate Va assumes a non-linear downwardly convex curve, as illustrated in FIG. 12. Furthermore, in FIGS. 12 to 14, Io1 [kJ/kg], Io2 [kJ/kg], Io3 [kJ/kg], and Io4 [kJ/kg] indicate outdoor air enthalpy values that have the relationships Io1>Io2>Io3>Io4. However, as illustrated in FIG. 12, the ventilation blown air mobility Wf does not change due to the magnitude of the outdoor air enthalpy.

When the indoor air enthalpy is taken to be Ii [kJ/kg], the outdoor air enthalpy is taken to be Io [kJ/kg], and the air density is taken to be ρa [kg/m³], an outdoor air cooling capacity Q_g [kW] is expressed by the below-listed formula (Equation 1).

$$Q\_g = Va/3{,}600 \times \rho a \times (Ii - Io) \qquad \text{Equation 1}$$

Figure 13:
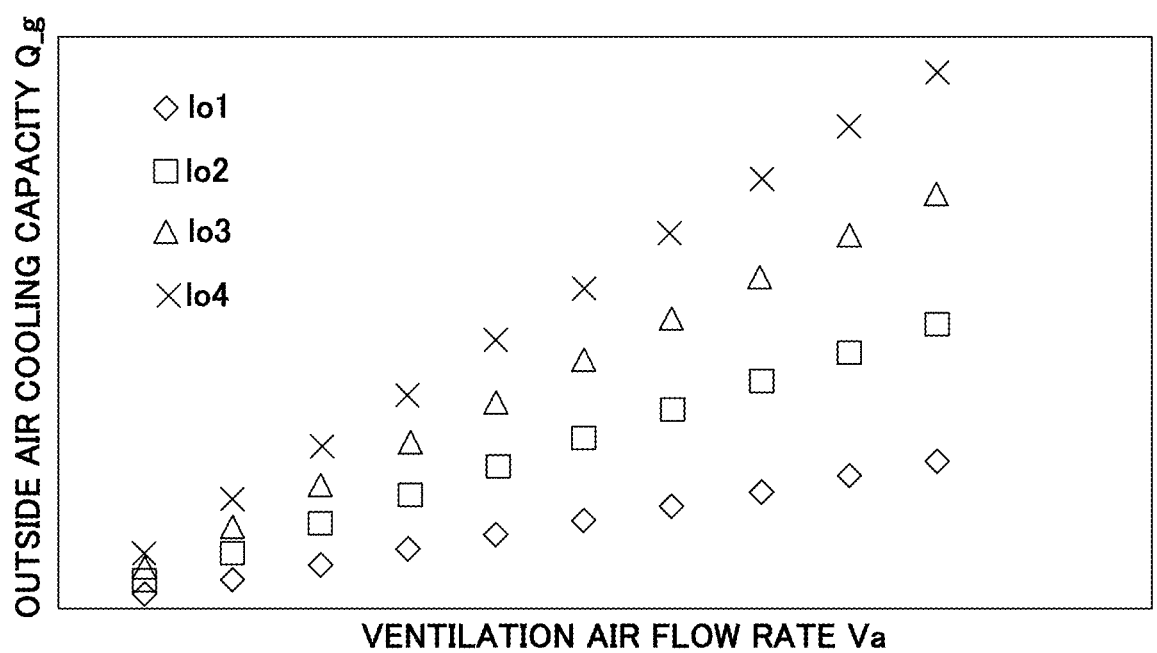
FIG. 13 is a graph illustrating a relationship between an outdoor air cooling capacity and the ventilation air flow rate.

Then as illustrated in FIG. 13, the relationship between the ventilation air flow rate Va and the outdoor air cooling capacity Qg is proportional, and the slope increases with decrease in the outdoor air enthalpy. In the example of FIG. 13, the slope is largest for Io4 that is the lowest outdoor air enthalpy.

Moreover, an outdoor air cooling efficiency COP_g is expressed by the below-listed formula (Equation 2).

$$COP\_g = Q\_g/Wf \qquad \text{Equation 2}$$

Figure 14:
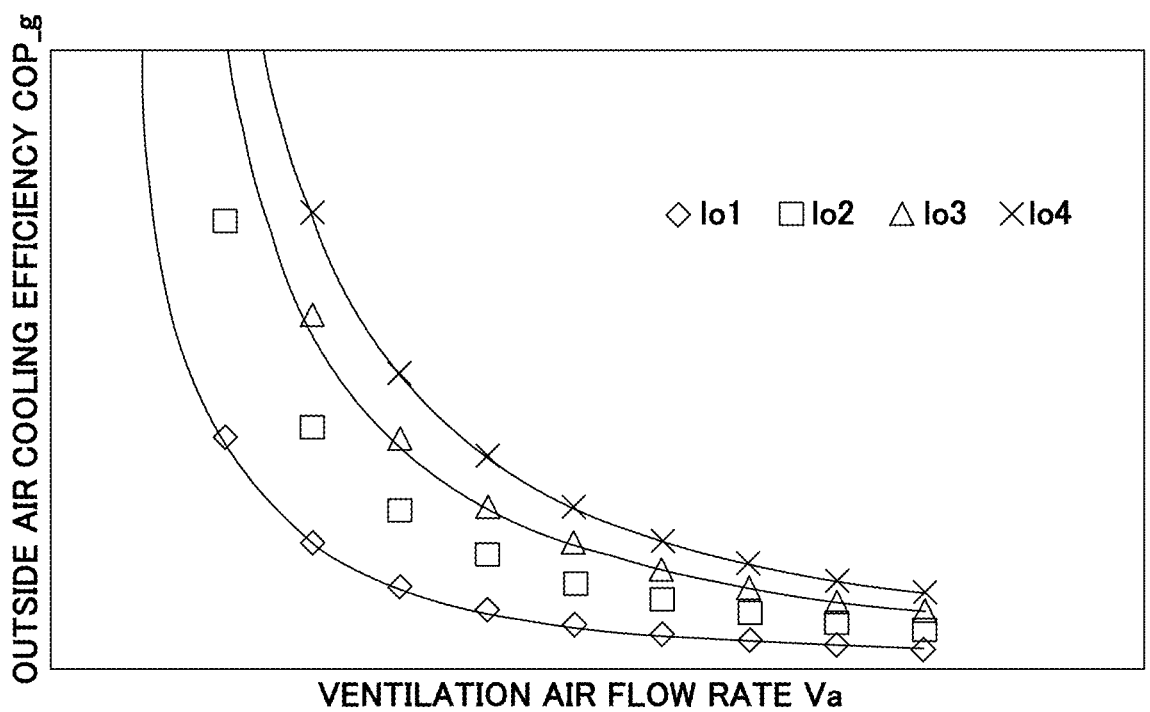
FIG. 14 is a graph illustrating a relationship between an outdoor air cooling efficiency and the ventilation air flow rate.

A relationship between the ventilation air flow rate Va and the outdoor air cooling efficiency COP_g, as illustrated in FIG. 14, assumes a non-linear downwardly convex curve. That is, the lower the ventilation air flow rate Va, the higher the outdoor air cooling efficiency COP_g; and the lower the outdoor air enthalpy, the higher the outdoor air cooling efficiency COP_g.

Moreover, an air flow rate Va0 is determined as the air flow rate Va for maintenance of a $CO_2$ concentration, for example, for maintaining the concentration at 1,000 ppm or less. Therefore, the ventilation air flow rate Va is to be adjusted to an air flow rate Va0.

Figure 15:
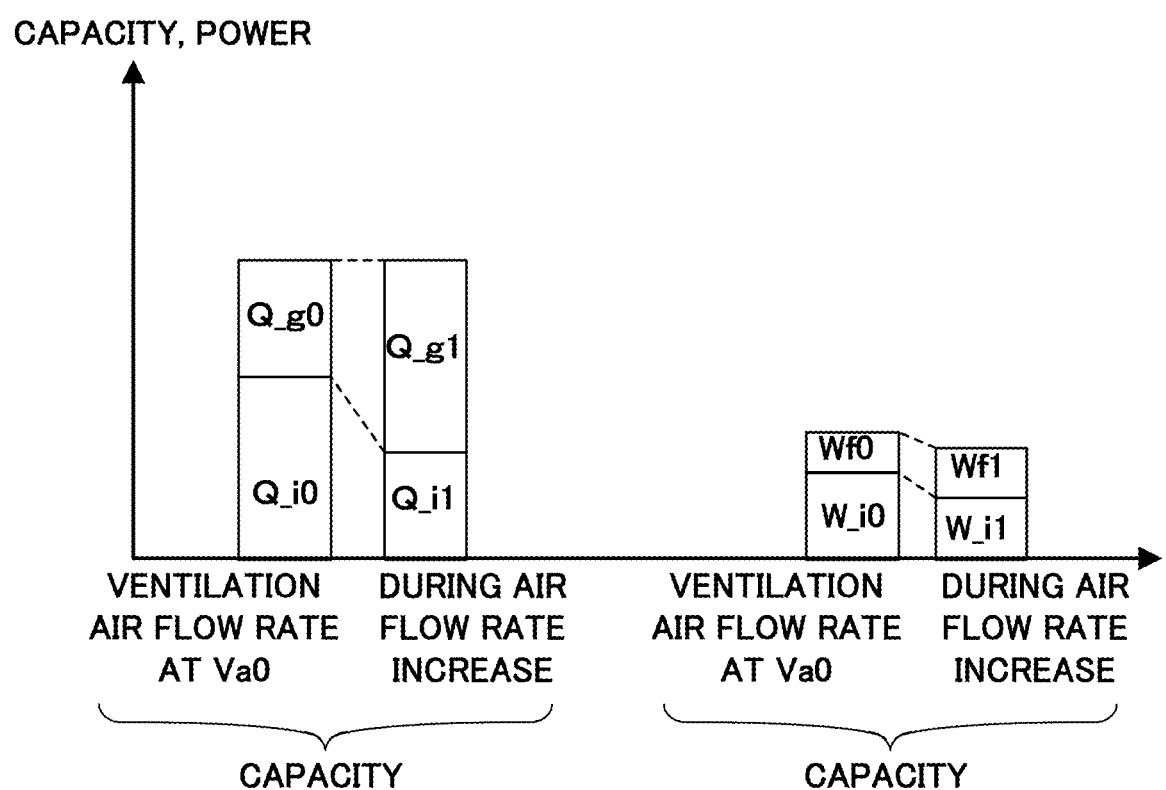
FIG. 15 is a graph for description of relationships between the ventilation air flow rate and power and capacity.

The capacity and the power consumption during outdoor air cooling are as illustrated in the left side of FIG. 15. Here, Q_i0 is the air conditioning-side capacity at the ventilation air flow rate Va0. Moreover, Q_g0 is an outdoor air cooling capacity at the ventilation air flow rate Va0. Moreover, Q_i1 is an air conditioner-side capacity when the ventilation air flow rate Va is increased from the ventilation air flow rate Va0. Further, Q_g1 is an outdoor air cooling capacity when the ventilation air flow rate Va is increased from the ventilation air flow rate Va0.

When the ventilation air flow rate Va increases, as may be understood from the characteristics of FIG. 13, the outdoor air cooling capacity Q_g increases. As indicated by the left side of FIG. 15, the outdoor air cooling capacity Q_g increases by an amount (Q_g1−Q_g0). However, the air conditioning-side capacity decreases by the amount of increase of the outdoor air cooling capacity Q_g, that is, decreases by (Q_g1−Q_g0).

However, W_i0 illustrated in the right side of FIG. 15 is the air conditioning-side power consumption at the ventilation air flow rate Va0. Moreover, Wf0 is the ventilation blown air mobility at the time of the ventilation air flow rate Va0. Moreover, W_i1 is the air conditioning-side power consumption when the ventilation air flow rate Va is increased from the ventilation air flow rate Va0. Wf1 is the ventilation blown air mobility when the ventilation air flow rate Va is increased from the ventilation air flow rate Va0.

When the ventilation air flow rate Va is increased, as may be understood from the characteristics of FIG. 12, the ventilation blown air mobility Wf increases. As indicated by the right side of FIG. 15, the ventilation blown air mobility Wf increases by (Wf1−Wf0). However, the air conditioning-side power consumption decreases by (W_i0−W_i1). Further, in the present disclosure, a ventilation blown air mobility increase amount is expressed by ΔWf=(Wf1−Wf0), and an air conditioning-side power reduction amount is expressed by ΔW_i=(W_i0−W_i1).

Here, the amount (Wf1−Wf0), that is to say, the ventilation blown air mobility increase amount ΔWf, can be predicted if the characteristics of FIG. 12 are understood beforehand. However, for the amount (W_i0−W_i1), that is to say, for the air conditioning-side power reduction amount ΔW_i, W_i0 and W_i1 can each be calculated by the below-listed formulae (Equation 3), by estimating an efficiency COP_i0 at a capacity Q_i0 and an efficiency COP_i1 at a capacity Q_i1.

$$W\_i0 = Q\_i0/COP\_i0$$

$$W\_i1 = Q\_i1/COP\_i1 \qquad \text{Equation 3}$$

A predetermined efficiency may be used as the air conditioning-side efficiency, or the air conditioning-side efficiency may be estimated from operating conditions, indoor and outdoor temperature conditions, or the like.

Here, the ventilation air flow rate Va1 that results in the highest value of ΔW_i−ΔWf is a point having the highest outdoor air cooling effect, that is, a point of highest energy-saving effect. That is to say, upon increase to the ventilation air flow rate Va1, the difference between the air conditioning-side power reduction amount ΔW_i and the ventilation blown air mobility increase amount ΔWf is maximum. The estimator 122 thus determines the ventilation amount Va1 for which ΔW_i−ΔWf is maximum. The below-described command unit 123 gives a command that sets the ventilation air flow rate Va1 determined in this manner as the blown air flow rate of the exhaust fan 44 to be adjusted by the air conditioning ventilation device 7.

The command unit 123 controls the communication unit 11 to send commands to be executed to the air conditioning ventilation device 7 and the opening-closing mechanisms 8. For example, in the case of determination by the determiner 121 that the outdoor air cooling is effective, the command unit 123 sends to the air conditioning ventilation device 7 a command to cause the start of the outdoor air cooling and also sends an opening command to the opening-closing mechanisms 8 to cause opening of the door member W. Furthermore, the command unit 123 causes the air conditioning ventilation device 7 to adjust the blown air flow rate of the exhaust fan 44 so as to become the ventilation air flow rate Va1 determined by the estimator 122.

Figure 16:
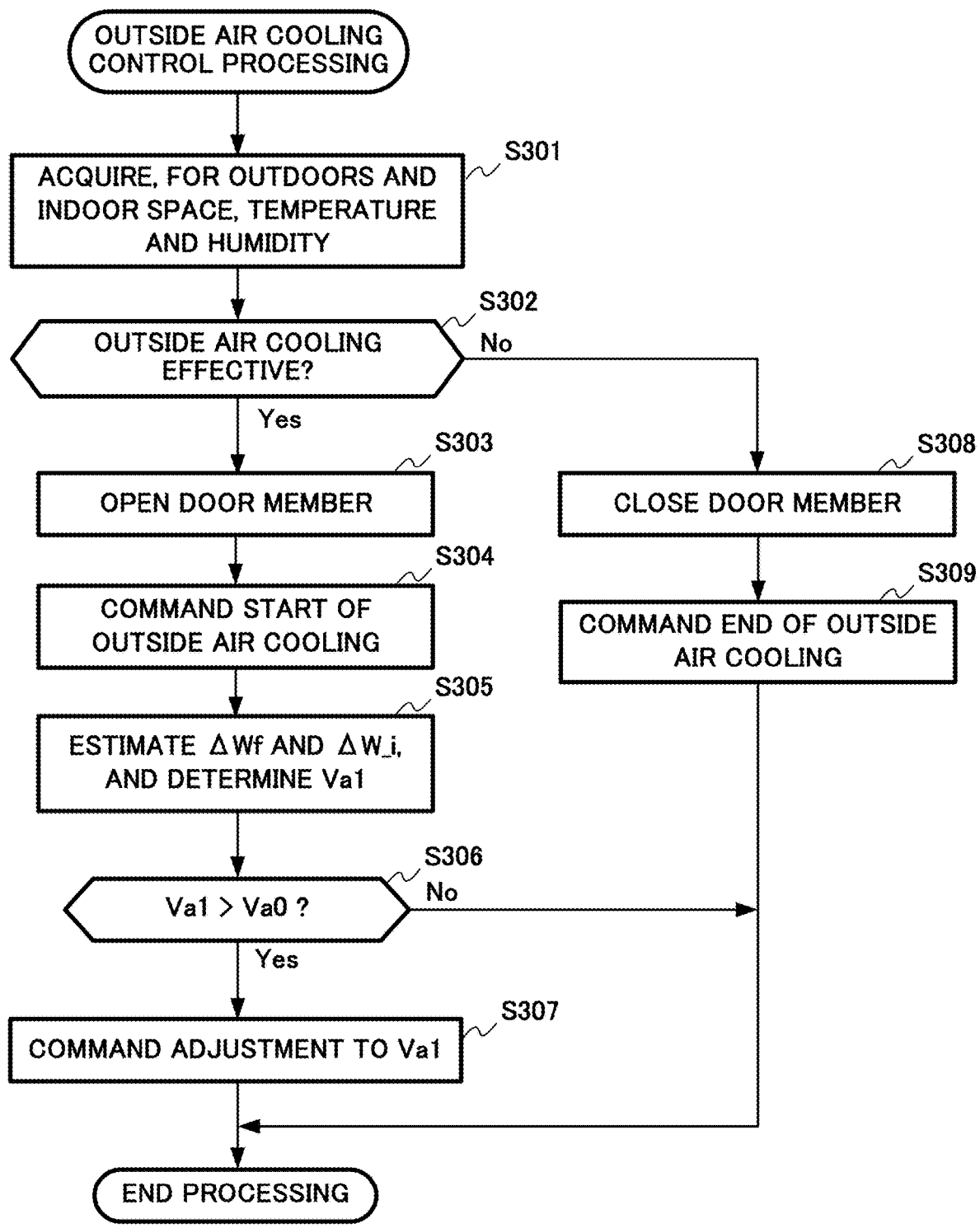
FIG. 16 is a flowchart illustrating an example of outdoor air cooling control processing.

The storage 124 stores various types of information to be used for control of the overall system. For example, the storage 124 stores programs for execution in a below-described outdoor air cooling control processing (FIG. 16).

Operation of the control device 10 of the air conditioning system 3 is described below with reference to FIG. 16. FIG. 16 is a flowchart illustrating an example of the outdoor air cooling control processing executed by the control device 10 (control unit 12). This outdoor air cooling control processing, for example, is executed repeatedly upon each passage of a fixed period.

Firstly, the control unit 12 acquires the outdoor and the indoor temperature and humidity values (step S301). That is to say, the control unit 12 controls the communication unit 11, and from the air conditioning ventilation device 7, acquires the temperature and humidity of the outdoor air OA measured by the sensor 48a, and acquires the temperature and humidity of the indoor air RA measured by the sensor 48b.

The control unit 12 determines whether the outdoor air cooling is effective (step S302). For example, the determiner 121 compares the outdoor air enthalpy found from the temperature and humidity of the outdoor air OA with the indoor air enthalpy found from the temperature and humidity of the indoor air RA, and determines that the outdoor air cooling is effective as long as the outdoor air enthalpy is lower than the indoor air enthalpy and the indoor units 6 are generating a cooling load.

Upon determination that the outdoor air cooling is effective (YES in step S302), the control unit 12 opens the door member W (step S303). That is to say, the command unit 123 sends the opening command to the opening-closing mechanism 8 via the communication unit 11 so that the door member W opens. Furthermore, upon detection by the opened-closed sensor 9 that the door member W is already opened, the control unit 12 skips the processing of step S303.

The control unit 12 gives a command to start the outdoor air cooling (step S304). That is to say, the command unit 123, via the communication unit 11, sends to the air conditioning ventilation device 7 a command to cause the start of the outdoor air cooling. Upon receiving this command, the air conditioning ventilation device 7 opens the damper 47 and causes stoppage of the air supply fan 42.

Furthermore, if the opening of the outdoor air cooling is previously commanded, the control unit 12 skips the processing of the step S304.

The control unit 12 estimates the ventilation blown air mobility increase amount $\Delta Wf$ and the air conditioning-side power reduction amount $\Delta W\_i$, and determines the ventilation air flow rate Va1 having the highest energy-saving effect (step S305). That is to say, the estimator 122 estimates the $\Delta Wf$ and the $\Delta W\_i$ using the aforementioned formulae (Equations 1 to 3), and determines the ventilation air flow rate Va1 for which $\Delta W\_i - \Delta Wf$ is maximum.

The control unit 12 determines whether the ventilation air flow rate Va1 is larger than the ventilation air flow rate Va0 (step S306). That is to say, the control unit 12 determines whether the ventilation air flow rate Va1 determined in step S305 is larger than the ventilation air flow rate Va0 for maintaining the $CO_2$ concentration. Upon determination that the ventilation air flow rate Va1 is not greater than (that is, is less than or equal to) the ventilation air flow rate Va0 (NO in step S306), the control unit 12 ends the outdoor air cooling control processing.

However, in the case of determination that the ventilation air flow rate Va1 is larger than the ventilation air flow rate Va0 (YES in step S306), the control unit 12 sends to the air conditioning ventilation device 7 a command for adjustment of the ventilation air flow rate Va1 (step S307). That is to say, the command unit 123 causes the air conditioning ventilation device 7 to adjust the blown air flow rate of the exhaust fan 44 so as to become the ventilation air flow rate Va1.

Moreover, upon determination in the aforementioned step S302 that the outdoor air cooling is not effective (is ineffective) (NO in step S302), the control unit 12 closes the door member W (step S308). That is to say, via the communication unit 11, the command unit 123 sends to the opening-closing mechanism 8 the closing command to close the door member W. If the door member W is detected by the opened-closed sensor 9 to be previously closed, the control unit 12 skips the processing of step S308.

The control unit 12 gives a command for stoppage of the outdoor air cooling (step S309). That is to say, the command unit 123, via the communication unit 11, sends to the air conditioning ventilation device 7 a command to cause stoppage of the outdoor air cooling. Upon receiving this command, the air conditioning ventilation device 7 closes the damper 47 and causes driving of the air supply fan 42. Furthermore, in the case in which the exhaust fan 44 air flow rate is being changed (adjusted), the air conditioning ventilation device 7 causes restitution of the air flow rate of the exhaust fan 44.

Furthermore, if the completion of the outdoor air cooling is previously commanded (or if the start of the outdoor air cooling is not being commanded), the control unit 12 skips step S309, and the outdoor air cooling control processing ends.

In this manner, blown air mobility can be lowered in order to cause stoppage of the air supply fan 42 during the outdoor air cooling. Moreover, due to determination of the ventilation air flow rate Va1 having the highest energy-saving effect during the outdoor air cooling and causing adjustment of the exhaust fan 44 air flow rate so as to result in this ventilation air flow rate Va1, the energy-saving performance occurring during outdoor air cooling can be appropriately improved.

Other Embodiments

In the aforementioned Embodiments 1 to 3, although cases are described of increasing the exhaust fan 44 air flow rate in order to increase the outdoor air cooling effect, the ventilation air flow rate may be increased by another technique. For example, the ventilation air flow rate may be increased by expanding the bypass air path 46, or by increasing the fan diameter of the exhaust fan 44. In the present disclosure, due to sufficiency of performance of such increase using just one side (the air discharge path 43 side in Embodiments 1 to 3), expansion of housing size of the air conditioning ventilation devices 4 and 7 can be suppressed.

Moreover, although cases are described of the use of the dedicated air conditioning ventilation devices 4 and 7 in the aforementioned Embodiments 1 and 2 and of the use of the dedicated control device 10 in the aforementioned Embodiment 3, an existing personal computer, information terminal device, or the like can be made to function as such air conditioning ventilation devices 4 and 7 and the control device 10 by application of operating programs to prescribe operations of the air conditioning ventilation devices 4 and 7 and the control device 10 for the personal computer, information terminal device, or the like.

Further, any method may be used for distribution of such a program, and for example, the program may be stored and distributed on a computer-readable recording medium such as a compact disc read-only memory (CD-ROM), a digital versatile disc (DVD), a magneto-optical (MO) disc, a memory card, or the like, and the program may be distributed through a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be used for an air conditioning ventilation device, an air conditioning system, and a control method that are capable of suitable improvement of energy-saving performance during outdoor air cooling.

REFERENCE SIGNS LIST 1, 2, 3 Air conditioning system
4, 7 Air conditioning ventilation device
5 Outdoor unit
6 Indoor unit
8 Opening-closing mechanism
9 Opened-closed sensor
10 Control device
11, 71 Communication unit
12, 40, 70 Control unit
41 Air supply path
42 Air supply fan
43 Air discharge path
44 Exhaust fan
45 Total heat exchanger
46 Bypass air path
47 Damper
48a, 48b Sensor
121, 401 Determiner
122 Estimator
123, 402, 702 Command unit
124, 403 Storage

The invention claimed is:
1. An air conditioning ventilation device comprising:
a first air path having a first air blower disposed therein and configured to supply outdoor air to an indoor space;
a second air path having a second air blower disposed therein and configured to discharge to outdoors indoor air from the indoor space;
a heat exchanger configured to perform heat exchange between the outdoor air passing through the first air path and the indoor air passing through the second air path;
a bypass air path connecting with the second air path and configured to bypass the heat exchanger;
an air path switcher configured to open and close the bypass air path; and
a controller configured to control the first air blower and the second air blower and control the air path switcher, wherein
the controller, during outdoor air cooling that takes additional outdoor air into the indoor space through an opening interconnecting the outdoors and the indoor space, controls the air path switcher to open the bypass air path, and causes stoppage of the first air blower.

2. The air conditioning ventilation device according to claim 1, further comprising:
a first sensor configured to detect (i) a temperature or (ii) a temperature and humidity for the outdoors; a second sensor configured to detect (i) a temperature or (ii) a temperature and humidity for the indoor space; and
a determiner configured to determine whether the outdoor air cooling is effective based on detection results of the first and second sensors.

3. The air conditioning ventilation device according to claim 1, wherein
the controller, during the outdoor air cooling, further causes an increase in a blown air flow rate of the second air blower.

4. The air conditioning ventilation device according to claim 1, further comprising:
an opener-closer configured to open and close a door member disposed at the opening interconnecting the outdoors and the indoor space, wherein
the controller, during the outdoor air cooling, further controls the opener-closer to open the door member and causes supply of air from the opening to the indoor space.

5. An air conditioning system comprising:
an air conditioning ventilation device;
an air conditioning device having an indoor unit and an outdoor unit configured to condition indoor air of an indoor space; and
a control device configured to control the air conditioning ventilation device and the air conditioning device, the control device, the air conditioning ventilation device, and the air conditioning device being interconnected via a communication line, wherein
the air conditioning ventilation device comprises (i) a first air path having a first air blower disposed therein and configured to supply outdoor air to the indoor space, (ii) a second air path having a second air blower disposed therein and configured to discharge to outdoors indoor air from the indoor space, (iii) a heat exchanger configured to perform heat exchange between the outdoor air passing through the first air path and the indoor air passing through the second air path, (iv) a bypass air path connecting with the second air path and configured to bypass the heat exchanger, and (v) an air path switcher configured to open and close the bypass air path,
the control device comprises (i) a controller configured to, during outdoor air cooling that takes additional outdoor air into the indoor space through an opening interconnecting the outdoors and the indoor space, control the air path switcher of the air conditioning ventilation device to open the bypass air path, and cause stoppage of the first air blower, and (ii) an estimator configured to estimate power of the air conditioning ventilation device and the air conditioning device,
the estimator estimates (i) a power increase amount of the air conditioning ventilation device, and (ii) a power reduction amount upon decrease in electric power consumed by performance of the outdoor air cooling by the air conditioning device, and
the controller adjusts the blown air flow rate of the second air blower such that a value obtained by subtracting the power increase amount from the power reduction amount is maximum.

6. A control method of an air conditioning ventilation device including (i) an air supply path having an air supply fan disposed therein for supplying outdoor air to an indoor space, (ii) an air discharge path having an exhaust fan disposed therein for discharging outdoors indoor air from the indoor space, (iii) a heat exchanger for performing heat exchange between the outdoor air passing through the air supply path and the indoor air passing through the air discharge path, (iv) a bypass air path connecting with the air discharge path for bypassing the heat exchanger, and (v) a damper for opening and closing the bypass air path, the method comprising:

a determination step of determining whether outdoor air cooling that takes additional outdoor air into the indoor space through an opening interconnecting the outdoors and the indoor space is effective based on, for the outdoors and the indoor space, (i) a temperature or (ii) a temperature and humidity; and a control step of, upon determining in the determination step that the outdoor air cooling is effective, (i) opening the damper to switch the air path through which air passes to the bypass air path, and (ii) causing stoppage of the air supply fan.

\* \* \* \* \*